Figure 1:
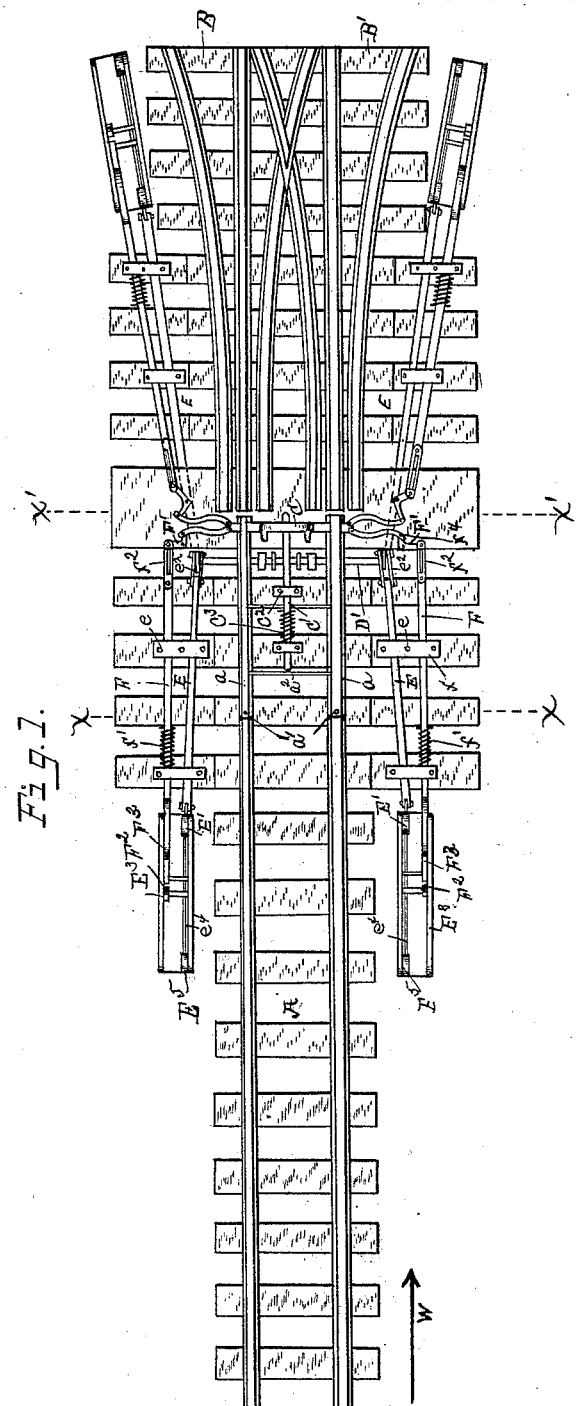

(No Model.) 8 Sheets—Sheet 1.

G. G. PASSINO.
RAILWAY SWITCH.

No. 421,428. Patented Feb. 18, 1890.

Witnesses
Wm. S. Hodges.
Charles F. Roberts.

Inventor
George G. Passino,
By his Attorney
Patrick O'Farrell.

(No Model.)
8 Sheets—Sheet 2.
G. G. PASSINO.
RAILWAY SWITCH.
No. 421,428.
Patented Feb. 18, 1890.
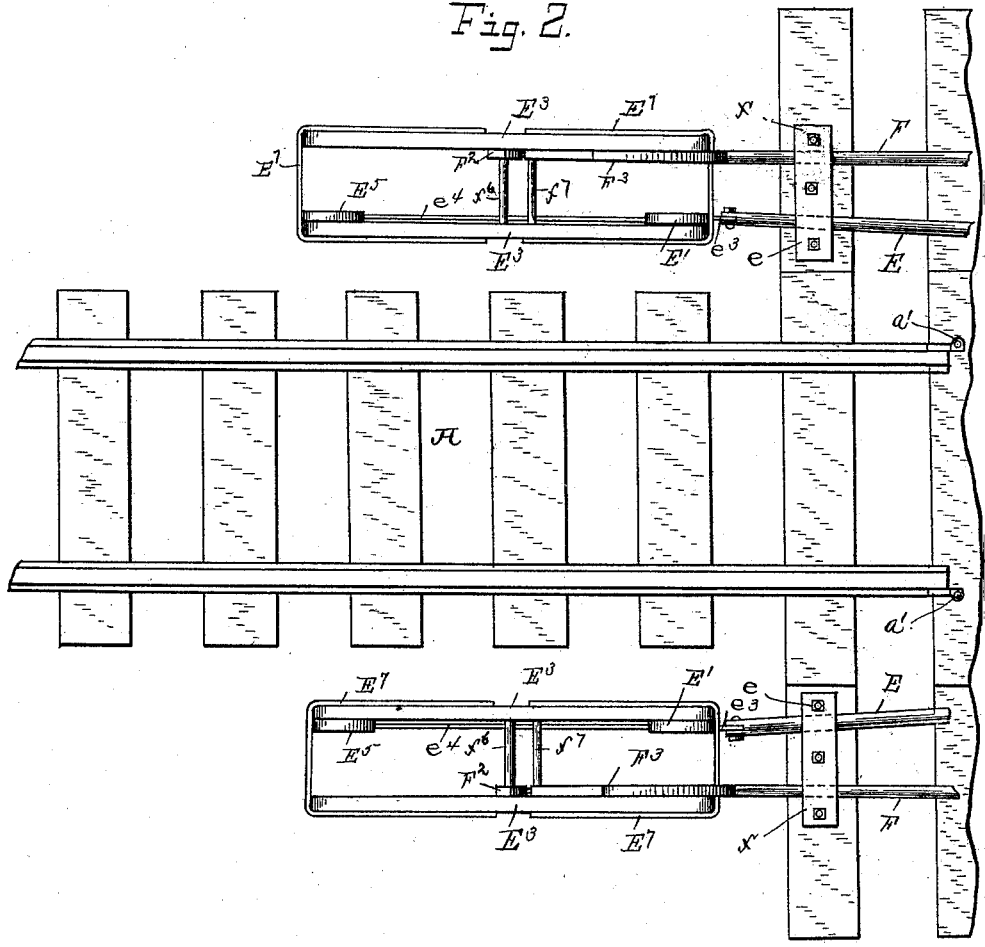
Witnesses
Wm. S. T. Hodges.
Charles F. Roberts.
Inventor
George G. Passino,
By his Attorney
Patrick O'Farrell.

(No Model.) 8 Sheets—Sheet 3.
G. G. PASSINO.
RAILWAY SWITCH.
No. 421,428. Patented Feb. 18, 1890.
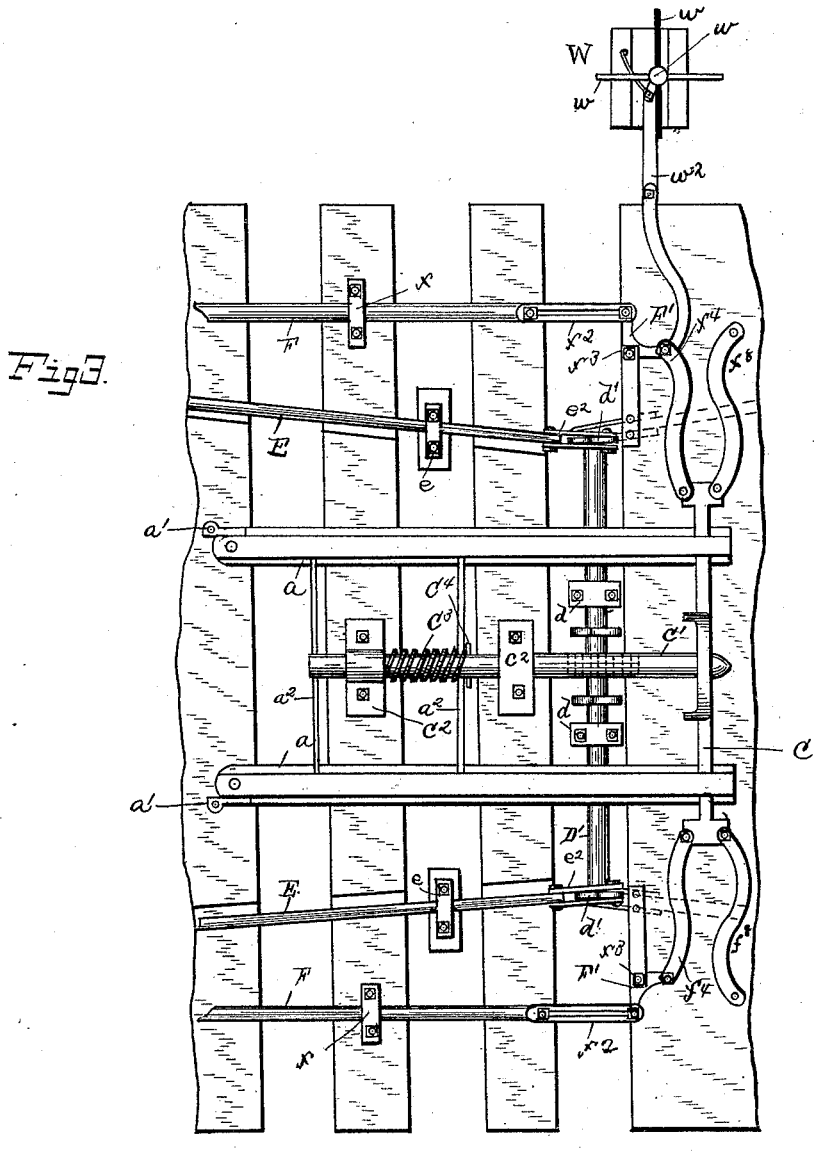
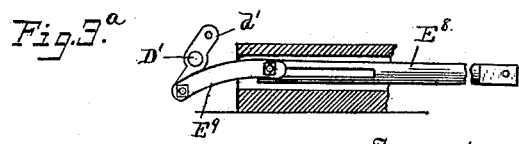
Witnesses
Wm. S. Hodges.
Charles F. Roberts.
Inventor
George G. Passino,
By his Attorney
Patrick O'Farrell.

(No Model.)
8 Sheets—Sheet 4.
G. G. PASSINO.
RAILWAY SWITCH.
No. 421,428. Patented Feb. 18, 1890.
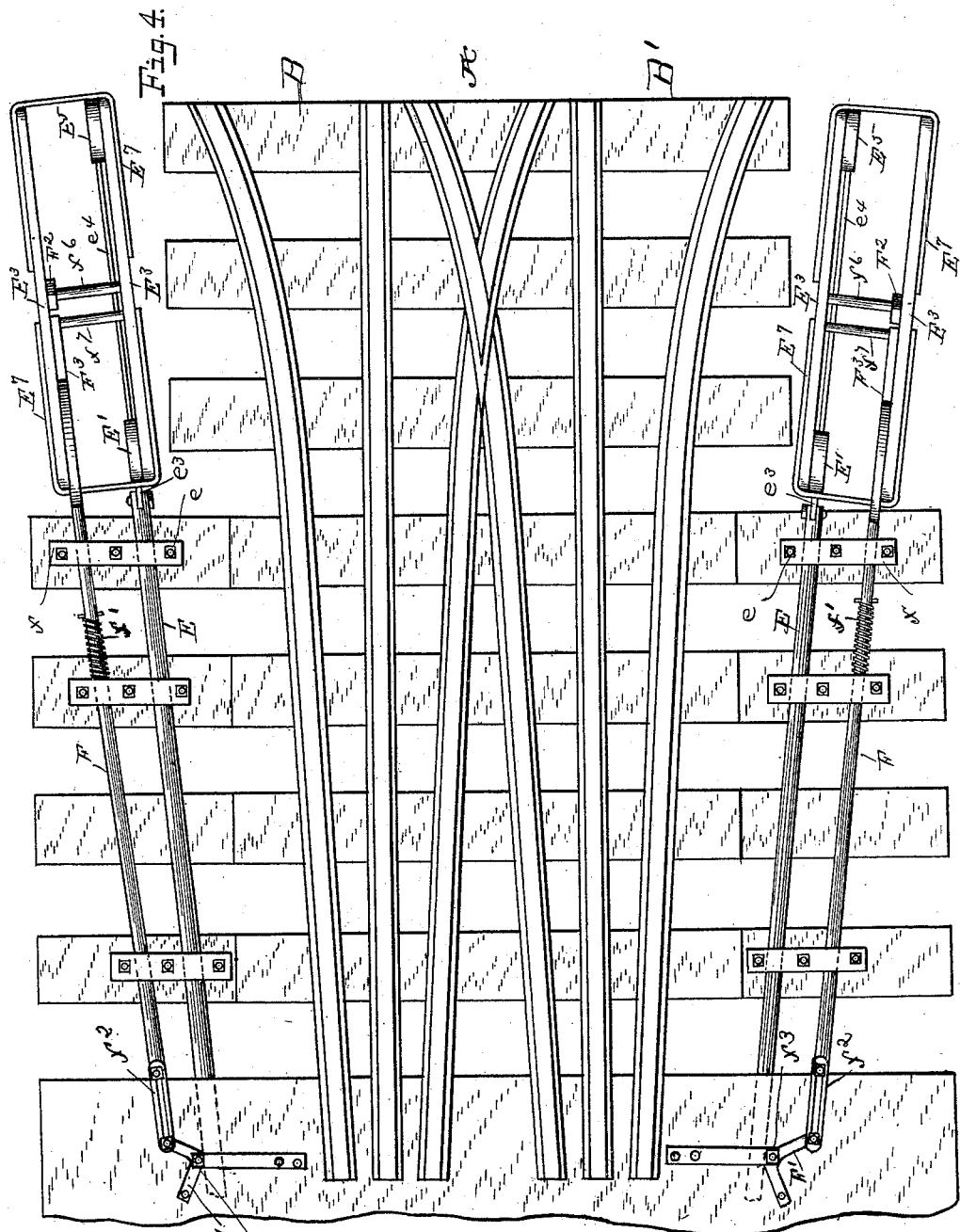
Witnesses
Wm. S. Hodges.
Charles F. Roberts.
Inventor
George G. Passino,
By his Attorney
Patrick O'Farrell.

(No Model.) 8 Sheets—Sheet 5.
G. G. PASSINO.
RAILWAY SWITCH.
No. 421,428. Patented Feb. 18, 1890.
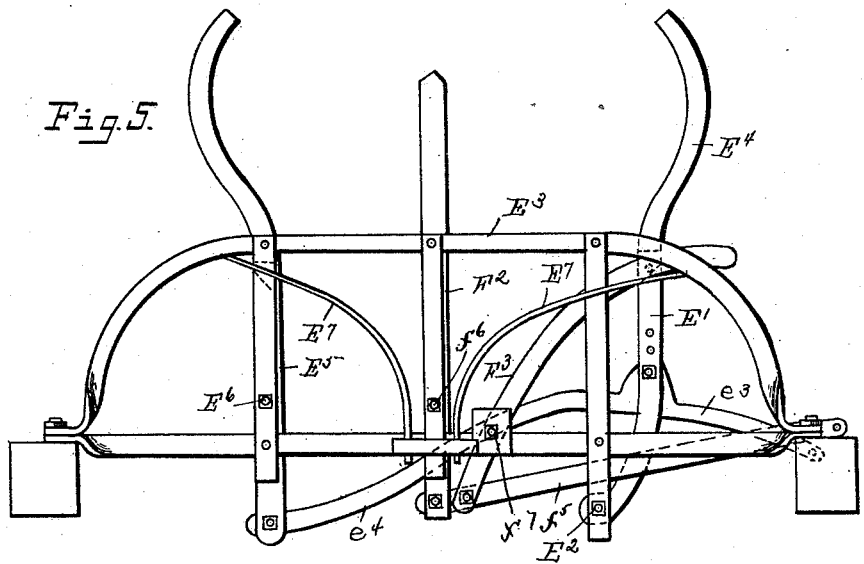
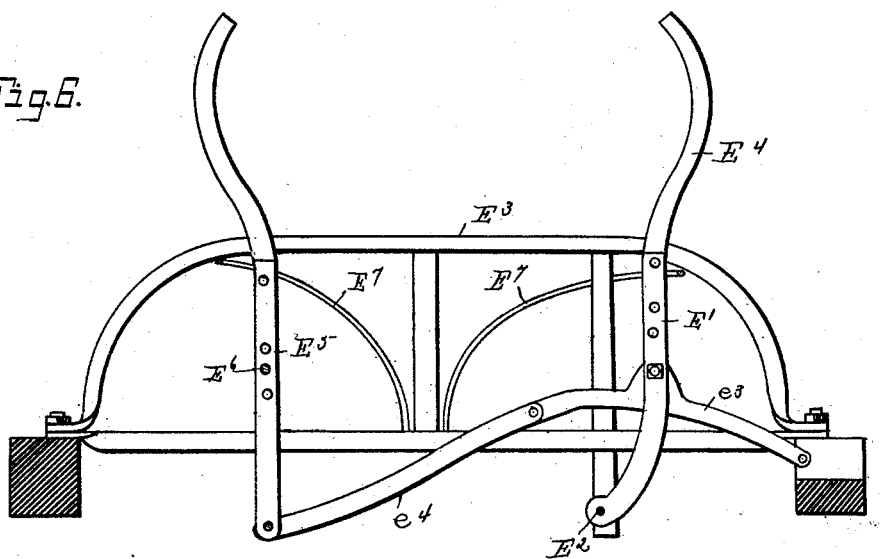
Witnesses
Wm S. Hodges.
Charles F. Roberts.
Inventor
George G. Passino,
By his Attorney
Patrick O'Farrell (No Model.) 8 Sheets—Sheet 6.
G. G. PASSINO.
RAILWAY SWITCH.
No. 421,428. Patented Feb. 18, 1890.
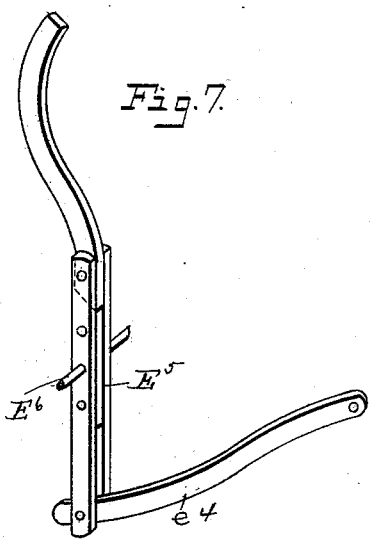
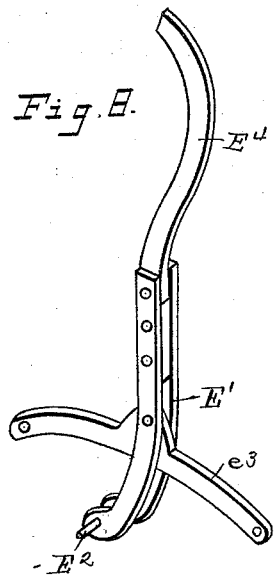
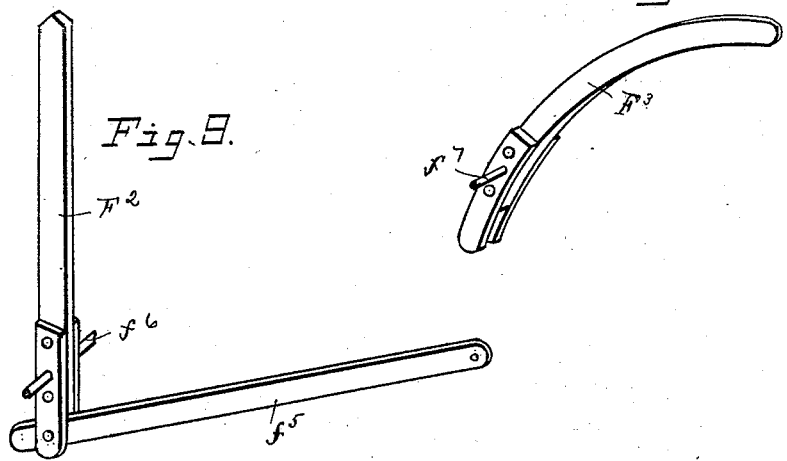
Witnesses
Wm. S. Hodges.
Charles. F. Roberts.
Inventor
George G. Passino,
By his Attorney
Patrick O'Farrell.

(No Model.)  8 Sheets—Sheet 7.

G. G. PASSINO.
RAILWAY SWITCH.

No. 421,428.  Patented Feb. 18, 1890.

Witnesses  
Wm. S. Hodges.  
Charles F. Roberts.

Inventor  
George G. Passino,  
By his Attorney  
Patrick O'Farrell.

(No Model.)  8 Sheets—Sheet 8.
G. G. PASSINO.
RAILWAY SWITCH.
No. 421,428. Patented Feb. 18, 1890.
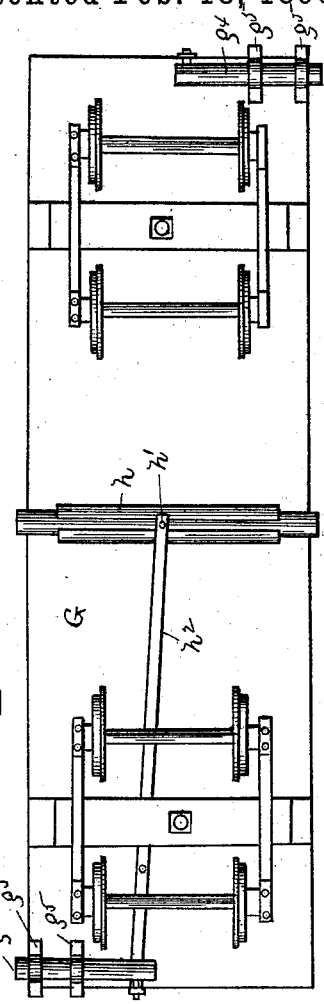
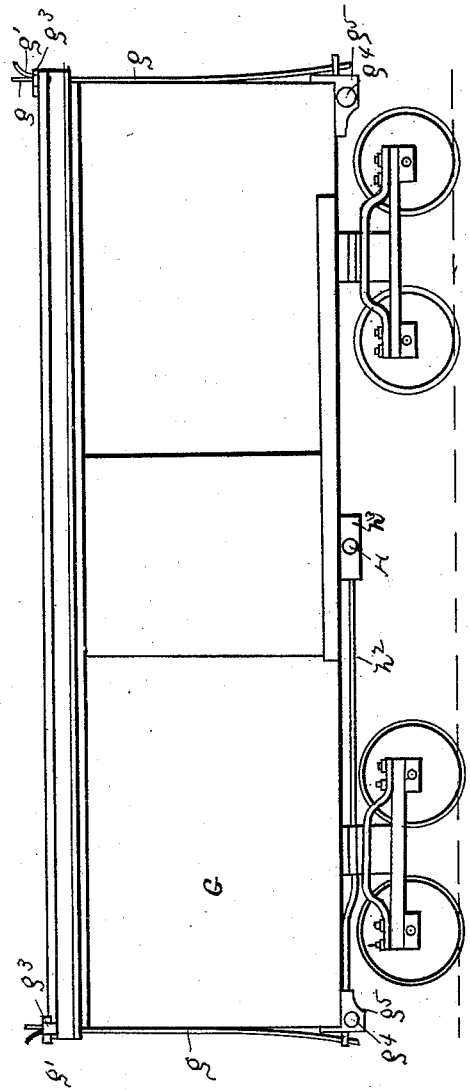
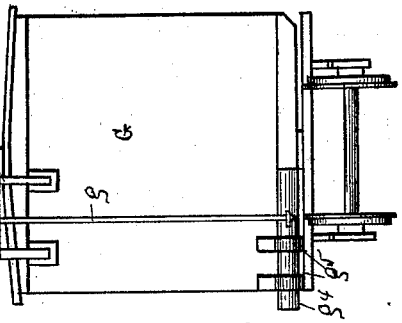
Witnesses
Wm. S. Hodges.
Charles. F. Roberts.
Inventor
George G. Passino,
By his Attorney
Patrick O'Farrell.

UNITED STATES PATENT OFFICE.

GEORGE G. PASSINO, OF CLEAR LAKE, (DAKOTA TERRITORY,) SOUTH DAKOTA.

RAILWAY-SWITCH.

SPECIFICATION forming part of Letters Patent No. 421,428, dated February 18, 1890.

Application filed September 7, 1889. Serial No. 323,299. (No model.)

*To all whom it may concern:*

Be it known that I, GEORGE G. PASSINO, a citizen of the United States of America, residing at Clear Lake, in the county of Deuel and Territory of Dakota, have invented certain new and useful Improvements in Railway-Switches, of which the following is a specification, reference being had therein to the accompanying drawings.

This invention pertains to certain new and useful improvements in railway-switches and in the method of operating the same. It has for its object the production of an improved form of switch capable of switching a car from the main track to either one of two branch tracks or from either of the latter to said main track from a car or cars of a passing train.

The invention comprises several series of levers connected each to the mechanism of the switch-rails, which, by reason of a projection of the car or cars of a passing train coming in contact with one of said series of levers, are first unlocked, then moved into alignment with the proper track, and then locked until the train has passed, after which said switch-rails will be unlocked and returned to their former position, if desired, when they will be again firmly locked in place.

With this and other objects in view the invention comprises the details of construction, combination, and arrangement of parts, substantially as hereinafter fully set forth, and particularly pointed out in the claims.

Figure 11:
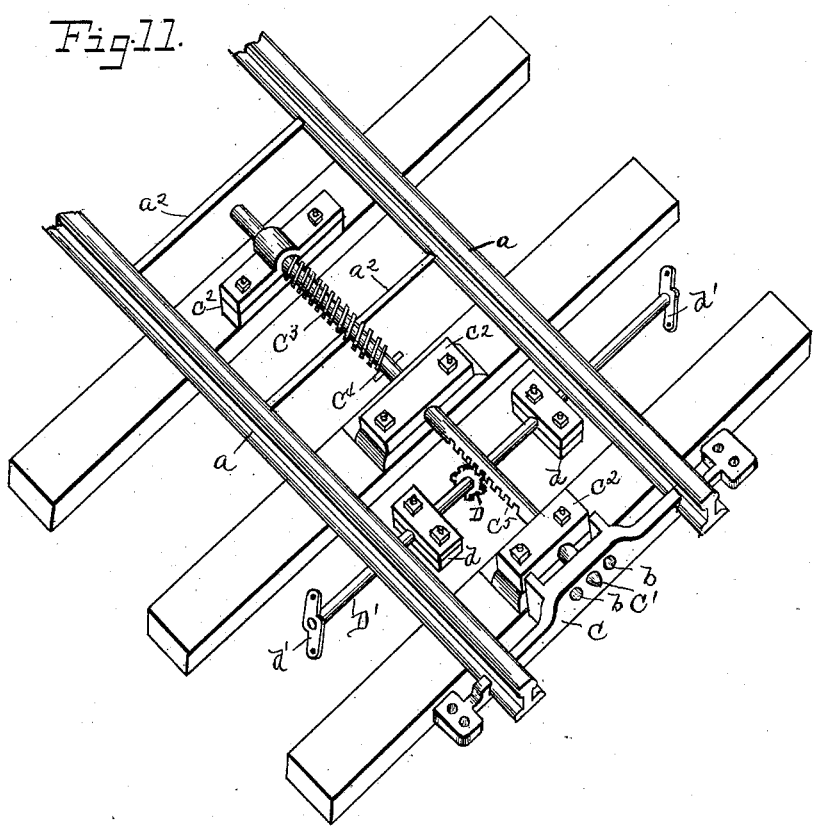
Figure 12:
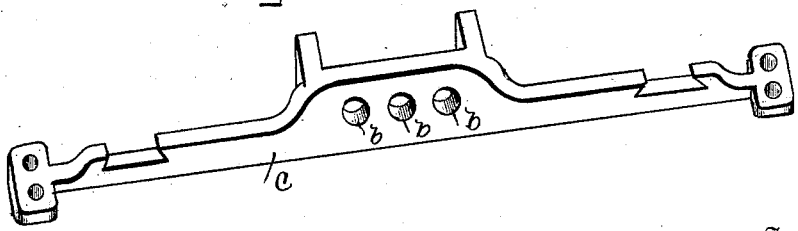

In the accompanying drawings, Figure 1 is a plan view of my improved switch. Figs. 2, 3, and 4 are similar but enlarged views, said Fig. 2 being illustrative of the parts to the left of the line $xx$, Fig. 3 being of that between said line and the line $x'x'$, while Fig. 4 is of the parts to the right of said latter line. Fig. $3^a$ is a detail sectional view showing the connection between the operating-rods on the side of a curved track and the locking-rod-operating bar. Fig. 5 is an enlarged side view of one series of switch-operating levers. Fig. 6 is a sectional view thereof; Figs. 7, 8, 9, and 10, details. Fig. 11 is a view of the locking mechanism for the switch-rails. Fig. 12 is a detail thereof. Fig. 13 is a side view of a car with my operating attachments applied thereto. Fig. 14 is an end view thereof. Fig. 15 is a bottom plan view.

Referring to the drawings, A designates the main track, B B' the curved side or branch tracks, and $a\,a$ the switch-rails, which are pivotally secured at $a'$ to the stationary rails of the main track. Cross-bars $a^2$ secured to these switch-rails hold the same in their proper relative position.

C is a bar rigidly secured to rails $a$ and provided with a central widened portion, wherein are formed three apertures $b$. Into either one of these apertures is designed to fit the forward end of a spring-held locking-rod C', which is held by keeper plates or boxes $C^2$, secured to the cross-ties. A spring $C^3$ encircles the rod C' and bears against the rearmost box $C^2$ and a pin $C^4$ of said rod. The under side of locking-rod C' has teeth $C^5$ formed therein, with which engages a pinion D, fast upon a rod D', journaled in boxes $d$, and provided at its ends with curved arms $d'\,d'$. By turning rod D' and pinion D locking-rod C' will be withdrawn from the aperture of box C, permitting the switching of the rails.

E E are two similar sliding rods supported by boxes $e$. Each rod has secured to its forward end two arms or pitmen $e^2$, pivotally connected at their outer ends to the end arm $d'$ of rod D'. To a short pivoted arm $e^3$ of each rod E is fulcrumed a lever E', pivotally secured by a pin or rod $E^2$ at its lower end between two parallel guide-frames $E^3\,E^3$, secured adjacent the track. To the upper end of lever E' is pivotally connected a curved arm $E^4$, having a lower beveled end engaging one edge of said lever. To arm $e^3$ is pivotally connected a second arm $e^4$, to the end of which is pivoted the lower end of a second normally-vertical lever $E^5$, fulcrumed by a pin or rod $E^6$ between frames $E^3$. This latter lever $E^5$ and the arm $E^4$ are designed to come in contact with curved spring-rods $E^7\,E^7$, secured to frames $E^3$, thereby insuring their proper position. It will be seen that lever $E^5$ and lever E', together with its arm $E^4$, by moving in opposite directions—*i. e.*, toward each other—will pull rearwardly on rod E, which will turn rod D' and effect the retraction of the spring-held locking-rod C' from bar C.

F F are a second set of sliding rods disposed adjacent to rods E, the same being supported by boxes $f\,f$, against one of which bears one end of a coil-spring $f'$, one spring encircling each of said rods F. To the forward end of each rod F are connected pitmen $f^2$, which at their other ends are connected to a bell-crank lever F', fulcrumed at $f^3$ to one of the ties. The other end of this bell-crank lever F' is connected by a pitman $f^4$ to the adjacent end of bar C, secured to the switch-rails. Thus by pulling on either rod F the switch-rails can be switched into the desired alignment, said rails moving in the direction of the operated rod. A short pivoted arm $f^5$ is secured to the rearmost end of each rod F, and to it is connected the lower end of a lever $F^2$, fulcrumed on a pin or rod $f^6$ between frames $E^3$. Adjacent to this lever $F^2$ is a lever $F^3$, fulcrumed on a pin or rod $f^7$, and having an upper curved end designed to bear against said lever $F^2$. By pressing down lever E' or lever $E^5$ the locking-rod is withdrawn, and then by forcing down lever $F^2$ the switch-rails are moved to the right or left, according as the series of levers operated upon is on the right or left hand side of the main track.

On the outer side of each curved or side track B B', I secure a duplicate set of the levers and rods above described.

To operate the locking-rod C', it is only necessary to secure to rod E a pivoted section $E^8$, having a pitman-connection $E^9$ at its forward end with the end arm $d'$ of rod D'. (See Fig. 3ª.) Hence the retraction of the locking-rod can be effected from this duplicate set of levers and rods. The switching of the rails is also effected by connecting a second pitman $f^8$ of bell-crank lever F' to the adjacent end of bar C.

The switch-rails are normally set in alignment with the rails of the main track, and are so held by the locking-rod C' being thrust through the central aperture $b$ of bar C. If a train going in the direction of the arrow $w$, Fig. 1, is to be switched onto the side track B, the operating-rod of the passing train, to be hereinafter described, is thrust out on the left of the train. Upon coming to the series of levers on that side of the track, the operating-rod will come in contact with lever $E^5$, forcing the same forward and downward and effecting through rod E the withdrawal of locking-rod C'. Said operating-rod next strikes the upright lever $F^2$, and, forcing the same forward, pulls on rod F and effects the switching of rails $a$ into alignment with track B, immediately upon which the same are firmly locked by the locking-rod entering the end aperture $b$ of bar C, the lever $E^5$ having resumed its former position. The train having passed over the switch, the operating-rod of the last car thereof will come in contact with the series of levers on the side of the curved track D, effecting, first, the unlocking of the parts, and, secondly, the resetting of the rails in alignment with the main track, as before explained.

In Fig. 13 I have shown a car G constructed to operate my improved switch. To each end of the car is secured a vertical lever $g$, having an upper spring-arm $g'$ engaging a toothed bar $g^2$ of a bracket $g^3$, through which it is inserted. (See Fig. 14.) The lower end of each lever is connected to a sliding rod $g^4$, held by keepers $g^5$, attached to the under side of the car, each rod being designed to move in the direction opposite to the other. In lieu of employing these two end rods $g^4$, a central rod H may be used. This rod is held by a long slotted guide-plate $h$, through the slot of which projects a pin $h'$ of said rod, and with this pin engages the end of a lever $h^2$, fulcrumed to the under side of car G. The outer end of this lever is connected to the lower end of lever $g$ in lieu of connecting-rod $g^4$ thereto. This central rod H is guided in its movement beyond either end of plate $h$ by apertured guide-blocks $h^3\ h^3$, as shown. By moving the upper end of lever $g$ the requisite extent rod H can be thrown out on either the right or left hand sides of car G; hence, in practice, as the train approaches the switch, the operator on the foremost car forces out the end or central operating-rod to the right or left, as the case may be, and the latter coming in contact with the levers, as before described, will effect the operation thereof and the throwing of the switch in the desired direction. After the train has passed the switch the operator on the rearmost car thereof forces out the operating-rod in a manner similar to that of the foremost car, and upon the same coming in contact with the series of levers on the side of the track now being traversed will effect the resetting and locking of the switch-rails.

From the foregoing description it will be seen that the unlocking, setting, and relocking of the switch-rails in alignment with the desired track is readily and easily accomplished by a passing car, as is also the unlocking, resetting, and again locking of said switch-rails after the train has passed.

By means of my invention there is a great saving of time and labor, and the delay consequent upon setting and resetting a switch is entirely obviated, since the stoppage of the train is rendered unnecessary, and the perfect working of the parts is insured.

In Fig. 3, at W, I have shown a signal which may be employed in connection with and operated by my improved switch, the same being located at one side of the track. It consists, briefly, of four wings $w$ on a rod $w'$, operated by a pitman-connection $w^2$, rigid at its inner end.

I claim as my invention—

1. The herein-described improvement in railway-switches, comprising the switch-rails having the apertured cross-bar, the spring-held locking-rod engaging said cross-bar and having teeth on its under side, the pivoted rod having a pinion in engagement with said teeth and provided with end arms, the rods connected to said arms, the levers connected to said rods, and the means for operating said switch-rails, substantially as set forth.

2. The herein-described improvement in railway-switches, comprising the switch-rails having the apertured cross-bar, the spring-held locking-rod engaging said cross-bar and having teeth on its under side, the pivoted rod having a pinion in engagement with said teeth and provided with end arms, the rods connected to said arm, the levers connected to said rods, the spring-held rods F, the connection between the same and said switch-rails, and the levers connected to said latter rods F, substantially as set forth.

3. In a railway-switch, the combination, with the switch-rails having the cross-bar, of the spring-held rods F, the bell-crank levers, the pitman-connections between the latter and said rods and switch-rails, and the levers connected to the outer ends of said spring-held rods, substantially as and for the purpose set forth.

4. In a railway-switch, the combination, with the switch-rails and the locking-rod therefor, of the pivotal rod engaging said locking-rod and having end arms, the rods E, having pitman-connections with said end arms, the pivoted arms secured to said rods E, the levers E' E⁵, connected with said rods, and the arms E⁴, pivoted to the upper ends of said levers E', substantially as set forth.

5. In a railway-switch, the combination, with the switch-rails having the apertured cross-bar, the series of oppositely-extended spring-held rods F, connected to said switch-rails, and the levers connected to said rods, of the series of oppositely-extended rods E, the spring-held locking-rod engaging said apertured cross-bar, the pivotal rod engaging said locking-rod and connected to said rods E, and the series of levers connected to said latter rods at and near their ends, substantially as set forth.

In testimony whereof I affix my signature in presence of two witnesses.

GEORGE G. PASSINO.

Witnesses:
 A. D. WILLIAMS,
 F. J. DANN.